United States Patent
Chinnamgari et al.

(10) Patent No.: US 11,887,045 B2
(45) Date of Patent: Jan. 30, 2024

(54) DETERMINING RESOURCE REQUIREMENTS

(71) Applicant: Maersk A/S, Copenhagen (DK)

(72) Inventors: Sunil Kumar Chinnamgari, Bangalore (IN); Abhishek Sanwaliya, Bangalore (IN)

(73) Assignee: Maersk A/S, Copenhagen (DK)

( * ) Notice: Subject to any disclaimer, the term of this patent is extended or adjusted under 35 U.S.C. 154(b) by 0 days.

(21) Appl. No.: 17/793,967

(22) PCT Filed: Feb. 4, 2021

(86) PCT No.: PCT/EP2021/052690
§ 371 (c)(1),
(2) Date: Jul. 20, 2022

(87) PCT Pub. No.: WO2021/160514
PCT Pub. Date: Aug. 19, 2021

(65) Prior Publication Data
US 2023/0066889 A1     Mar. 2, 2023

(30) Foreign Application Priority Data
Feb. 12, 2020   (DK) ................................ 202000173

(51) Int. Cl.
*G06Q 10/083*    (2023.01)
*G06Q 10/04*     (2023.01)

(52) U.S. Cl.
CPC ......... *G06Q 10/0838* (2013.01); *G06Q 10/04* (2013.01)

(58) Field of Classification Search
CPC ........................... G06Q 10/0838; G06Q 10/04
(Continued)

(56) References Cited

U.S. PATENT DOCUMENTS

| | | | |
|---|---|---|---|
| 2015/0317589 A1* | 11/2015 | Anderson | G06N 20/10 705/7.25 |
| 2016/0048788 A1 | 2/2016 | Martin et al. | |
| 2019/0340543 A1 | 11/2019 | Gerenstein et al. | |

FOREIGN PATENT DOCUMENTS

| | | |
|---|---|---|
| CN | 109492812 A | 3/2019 |
| CN | 109697531 A | 4/2019 |

(Continued)

OTHER PUBLICATIONS

"Kernel Methods in Machine learning" Published by Institute of Mathematical Statistics (Year: 2008).*

(Continued)

*Primary Examiner* — Zeina Elchanti
(74) *Attorney, Agent, or Firm* — EIP US LLP

(57) ABSTRACT

A method (200) for determining future resource requirements in a given location, the method comprising the steps of obtaining (110) transaction data, the transaction data indicative of past resource use at a given location. At least one model may be trained (120) based on a set of parameters by determining (121) a distribution associated with the transaction data; and generating (122) a kernel based on the distribution and the set parameters, the kernel being arranged to output an estimated distribution. The kernel is refined (123) and validated (124) based on a comparison between the distribution and the estimated distribution. A density map is then generated (125) based on the at least one trained model. The density map is then sent (130) to a control system for determining future resource requirements in the given location.

15 Claims, 4 Drawing Sheets

(58) Field of Classification Search
USPC .......................................................... 705/341
See application file for complete search history.

(56) References Cited

FOREIGN PATENT DOCUMENTS

| | | |
|---|---|---|
| CN | 109829667 A | 5/2019 |
| CN | 109978462 A | 7/2019 |
| WO | WO2014075108 | 5/2014 |
| WO | WO2019021300 | 1/2019 |
| WO | 2019222738 A1 | 11/2019 |

OTHER PUBLICATIONS

Danish Search Report dated Aug. 5, 2020 for Danish Application No. PA 2020 00173.
Danish Search Report dated Jul. 22, 2022 for Danish Application No. PA 2020 00173.

* cited by examiner

DETERMINING RESOURCE REQUIREMENTS

TECHNICAL FIELD

The present invention relates to methods, apparatus and systems for determining resource requirements. The disclosure has particular, but not exclusive relevance to determining future resources requirements at a given location.

BACKGROUND

In transportation and logistics, such as consigner to consignee delivery the positioning of resources is both time-intensive and costly. As such it is desirable to achieve cost and time-efficient transit by positioning resources, such as delivery vehicles in strategic locations so they are in the right place at the right time.

Being able to position such resources is a challenge, and is dependent on a number of factors, including but not limited to, weather conditions and seasonal events. Therefore, it is desirable to improve the efficiency and reduce the cost of determining the position of the resources whilst considering such factors.

SUMMARY

According to a first aspect of the present invention, there is provided a method for determining future resource requirements in a given location, the method comprising the steps of obtaining transaction data, the transaction data indicative of past resource use at a given location; training at least one model based on a set of parameters by determining a distribution associated with the transaction data; generating a kernel based on the distribution and the set parameters, the kernel being arranged to output an estimated distribution; refining and validating the kernel based on a comparison between the distribution and the estimated distribution; generating a density map based on the at least one trained model; and sending the density map to a control system for determining future resource requirements in the given location. This enables a control system to indicate the most efficient location to place resources based on the density maps.

Preferably, the step of determining the distribution comprises the step of extracting a pattern from the transaction data; and analysing the pattern from the transaction data to determine the distribution. This enables patterns within the transaction data to be used to determine the distribution and therefore aid in the generation of more accurate density maps.

The method may further comprise the step of normalizing the transaction data, wherein the step of determining a distribution is associated with the normalized transaction data. This enables the data to be adjusted, and kernels generated which take into account particularly busy locations, such that they do not adversely affect less busy locations.

Preferably, the step of generating the density map comprises determining a performance characteristic for each of a plurality of trained models; and selecting at least one of the trained models based on the performance characteristic. This enables multiple different models to be trained, and the most accurate to be selected.

The step of generating the density map based on the at least one trained model may comprise combining a plurality of trained models to generate a composite model, and generating the density map based on the composite model. This enables multiple models to be generated, and the density map to be based on a combination of the models, such that different models may be used to generate different areas of the density map, for example.

The set of parameters may comprise at least one of date; time; public holidays; and weather conditions associated with the plurality of locations. This ensures that factors which affect particular locations in a given time period are taken into account when determining the density map.

Preferably, the given location represents a predefined area, which may be at least one of a building address; a postal or zip code; a street; a city district; a city; a county; a state; a country. This enables density maps to be generated for a plurality of different locations, at different levels, so as to provide the most accurate density map for each of the different predefined areas.

Preferably, the method further comprises the step of outputting the density map to at least one of a display of the control system; and a resource of the control system. This enables the density map to be used by the system to position resources at desirable locations.

Optionally, the control system comprises a vehicle. This enables the density map to be used to position the vehicle, such as an autonomous vehicle.

According to a second aspect of the present invention, there is provided an apparatus for determining future resource requirements in a given location, the apparatus for performing the method according to the first aspect.

According to a third aspect of the present invention, there is provided a control system comprising: the apparatus of the second aspect; and an output device for receiving the density map output by the apparatus.

The system may further comprise storage for storing at least transaction data indicative of past resource usage. This enables the system to have efficient access to a variety of transaction data and other data, such as sets of parameters, for generating density maps quickly and efficiently.

The system may further comprise an input interface configured to enable a user of the system to manually adjust the density map.

According to a fourth aspect of the present invention, there is provided a computer-readable storage medium, storing instructions that, when executed by a processor, cause the processor to obtain transaction data, the transaction data indicative of past resource use at a given location; train at least one model based on a set of parameters by determining a distribution associated with the transaction data; generating a kernel based on the distribution and the set parameters, the kernel being arranged to output an estimated distribution; refining and validating the kernel based on a comparison between the distribution and the estimated distribution; and generating a density map based on the at least one trained model; and send the density map to a control system to determine future resource requirements.

BRIEF DESCRIPTION OF THE DRAWINGS

Further features and advantages of the invention will become apparent from the following description of preferred embodiments of the invention, given by way of example only, which is made with reference to the accompanying drawings in which like reference numerals are used to denote like features.

DETAILED DESCRIPTION

Details of methods, apparatus and systems, according to examples will become apparent from the following description with reference to the Figures. In this description for the purpose of explanation, numerous specific details of certain examples are set forth. Reference in the specification to 'an example' or similar language means that a feature, structure, or characteristic described in connection with the example is included in at least that one example, but not necessarily in other examples. It should be further noted that certain examples are described schematically with certain features omitted and/or necessarily simplified for the ease of explanation and understanding of the concepts of the examples.

Determining the location of areas which can provide cost-effective and time-efficient management of resources, such as when shipping consignments, locating medical supplies, or locating shared resources such as vehicles for use in ride-sharing, or autonomous vehicles, can be hindered by a lack of understanding of particular patterns evident in data representing the positioning of resources at a previous time. Furthermore, whilst one pattern of the placement of particular resources may be valid for a particular time, external factors can influence the likelihood of the placement suggested by the pattern being incorrect for another time, or even for another location.

Therefore, it is an object of the invention to provide a method, apparatus and system for determining optimal locations for the placement of resources in a given area.

Figure 1:
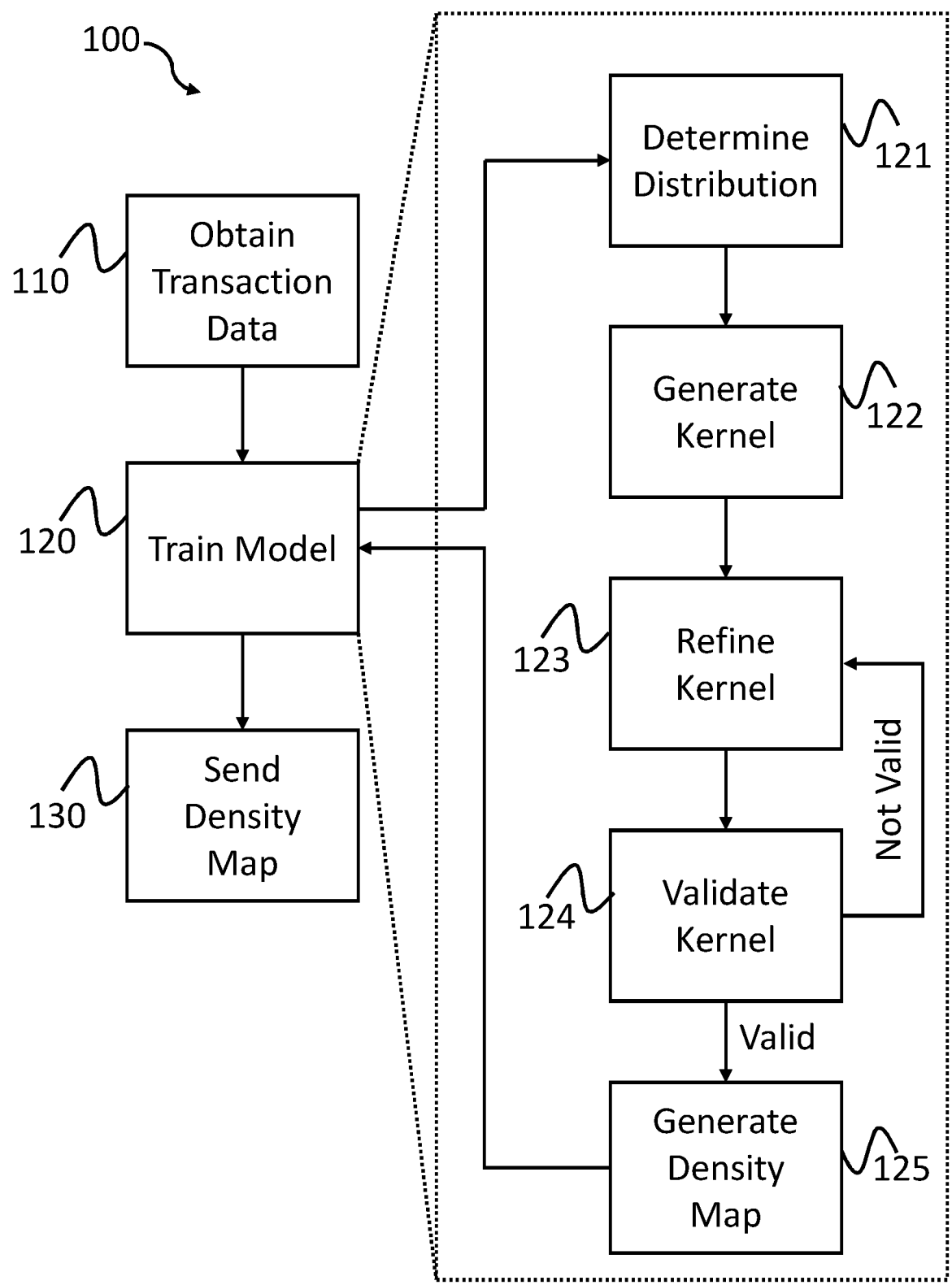
FIG. 1 is a flow diagram illustrating a method according to a first example.

FIG. 1 is a flow diagram illustrating a method 100 according to an example. At item 110 transaction data is obtained. The transaction data is representative of past resource usage at a given location, and may, in some examples be obtained from memory, or in other examples may be input by a user of a system. The transaction data is representative of previous resource usage for a given location, such as data representing the locations of consignments sent and received in a particular period for a particular location. The particular location may be a given country, a given county/state, a city, a street, a postal or zip code area, or a particular building address. As such, for the particular location, the transaction data provides an overview of what the resource requirements of the particular location were in the time period. Data for a given consignment within the transaction data may comprise any of a shipment identifier, package dimensions, arrival and departure times, recipient address information, and sender address information. It will be appreciated that individual transactions within the transaction data may comprise other fields, and may only comprise some of the fields listed above.

Once the transaction data has been obtained, the method 100 proceeds to item 120 which is used to train a model for determining a density map. The model is trained to generate a density map for illustrating the future resource requirements for a given location. Training the model comprises, at item 121, determining a distribution associated with the transaction data. The distribution is indicative of the resource requirements for a particular location within the areas covered by the transaction data. For example, where the transaction data comprises data for resource requirements (such as consignments sent and received) in a given city, the distribution may provide an indication as to the density of the resources in particular streets, buildings, or towns within that city over a given period.

Determining the distribution 121 may comprise extracting a pattern from the transaction data, for example where the transaction data covers a particular time period, such as a month, then extracting a pattern may comprise determining that there is a spike in resource use every Tuesday, for example. It will be appreciated that this is merely an example of such a pattern, and that any other number of patterns may be extracted, and that the transaction data may cover longer or shorter periods of time. To determine the distribution, the patterns extracted from the transaction data may be analysed, and a distribution determined. The extracted patterns may then be analysed to determine a distribution. In some examples, the transaction data may be normalized, this ensures that differences between locations within the transaction data are adjusted relative to one another. It will be appreciated that the normalization may occur within the train model item 120 or alternatively may occur prior to training a model 120, such as when multiple models are to be trained as will be described below in relation to FIG. 2. For example, if location A has a high number of transactions, then data associated with location A may be normalized against a high transaction threshold, whereas if location B has a lower number of transactions, then data associated with location B may be normalized against a lower transaction threshold. This enables the data to be adjusted, and kernels generated which take into account particularly busy locations. In the example of the delivery of consignments, where a particular logistics company has a hub, a large number of transactions will be contained within the data which list the location of the hub, this could adversely affect the kernel generation process, and as such, normalizing the distribution generated from the transaction data can account for this anomalous location.

At item 122 the distribution is used to generate a kernel which outputs an estimated distribution. The kernel is a machine learning kernel for use in a classifier, such as a support vector machine, and which is used to determine similarities between two sets of data, for example, the transaction data, or patterns within it and the estimated distribution to be generated, which is used to generated a density map representative of future resource requirements. The kernel is generated not only based on the distribution of the transaction data, but also on a set of one or more parameters.

The one or more parameters represent information which may cause the distribution generated from the transaction data to be altered, for example, if the transaction data represents a particular period of time, such as over the Easter period in one year, then in another year the Easter period may not be in the same period, and as such resource requirements over that period may be lower than would be expected if the future resource requirements were based on data representative of the previous year's Easter period. Therefore, the set of parameters may include date and time information, public holiday information, and even seasonal information such as the weather forecast on a particular day. In some examples, the set of parameters may comprise historical density maps for a given location representative of resource uses over a different time period. It will be appreciated that a number of other parameters may be used to ensure the distribution more accurately reflects the period for which future resource requirements are to be determined. Furthermore, these parameters can vary based on the given location, for example, the set of public holidays in the United State differs from the set of public holidays in the United Kingdom, and where resources are being transported across borders, it will be necessary to consider, for example, the weather in both locations and the public holidays in both locations.

Following the generation of the kernel, at item 123 the kernel is refined. That is, weighting factors associated with the kernel are adjusted such that the output of the kernel (the estimated distribution) more accurately represent the distribution determined at item 121. This is achieved by comparing the estimated distribution and the distribution determined at item 121. In some examples, refining the kernel may comprise selecting a different type of kernel, such as selecting any one of a gaussian, top hat or epanechnikov kernel, if they more accurately reflect the actual gradients of the distribution associated with the transaction data.

To determine the accuracy of the kernel, the output of the kernel is validated at item 124. The validation of the kernel may comprise generating an output from the kernel using test data, representative of the transaction data (for example a similar period in a previous year) to determine whether the output of the kernel is substantially similar to the distribution determined from the transaction data. It will be appreciated that other methods for validating the output of the kernel may be used. If the output of the kernel is substantially similar, the distribution based on the transaction data generated at item 121, then the method proceeds to item 125, where a density map representative of expected future resource usage is generated. If the output of the kernel is not substantially similar, then the method returns to item 123 where the kernel is refined further, and the refined kernel's output is validated again at item 124. Items 123 and 124 then loop until the kernel is validated and its output is substantially similar to the expected distribution.

As mentioned above, at item 125 the density map is generated. The density map is representative of areas where resources will be required at a given future time. The density map also provides an indication of the number of resources required for example in the form of a heat map, where areas with larger resource requirements are shown with a higher density and areas with lower resource requirements are shown with lower density, as will be explained with reference to FIG. 5, below.

Following generation of the density map, the density map is sent to a control system. The control system may comprise a display or other resources for receiving the density map. For example, the display may be used to show the density map to a user of a system, so that they can arrange for resources to be allocated accordingly, additionally and/or alternatively the density map may be sent to another resource of the control system, such as memory and/or a vehicle itself, such as a delivery truck. In some examples where the vehicle is an autonomous vehicle, the density map may enable a vehicle to navigate to a required location at the future time, based on the resource requirements set out in the density map.

Figure 2:
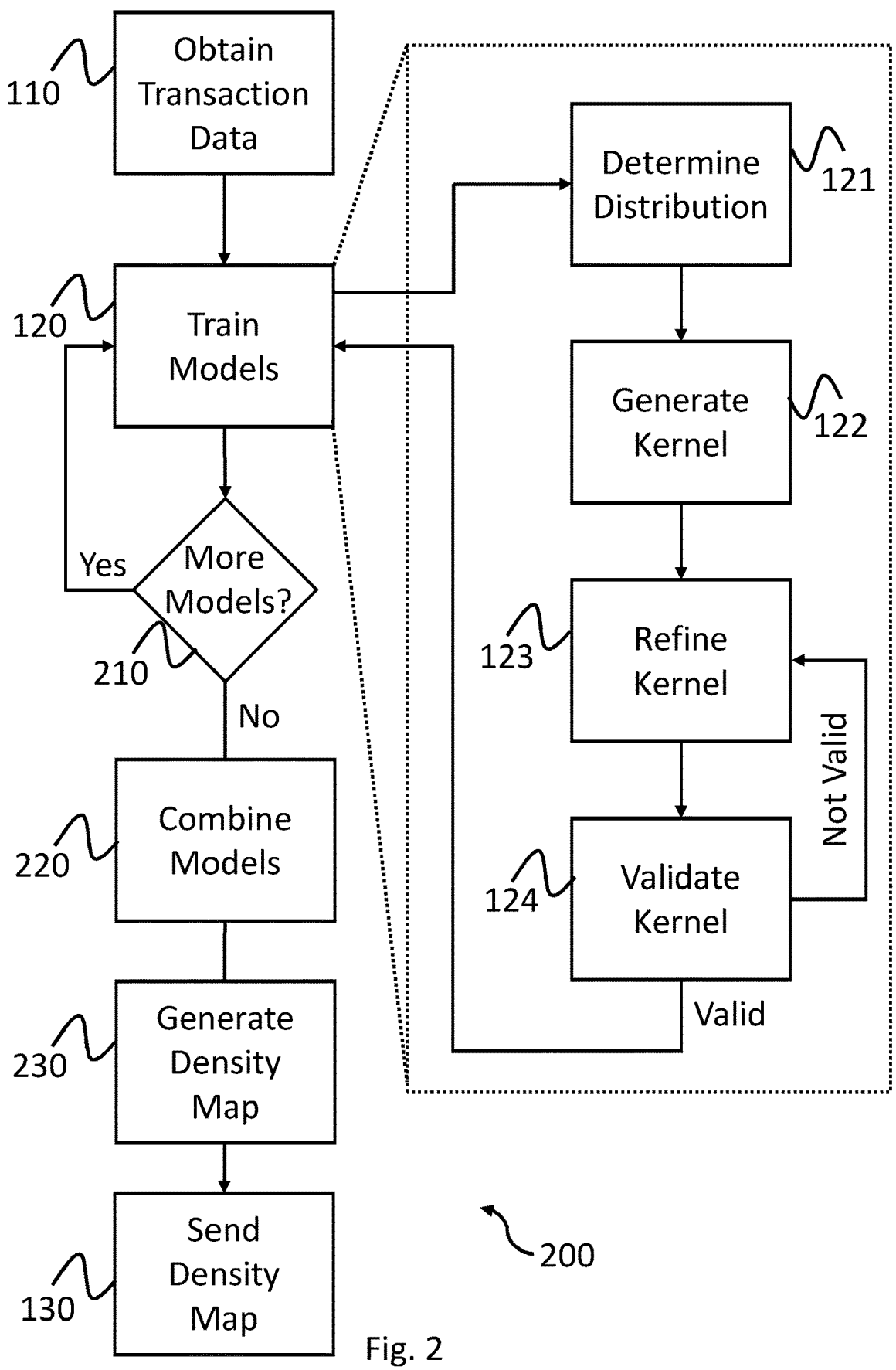
FIG. 2 is a flow diagram illustrating a method according to a second example.

FIG. 2 is a flow diagram illustrating a method 200 according to a second example. The method 200 comprises a number of steps 110, 120, 130 of the example described above in relation to FIG. 1. Furthermore, the train model item 120 also comprises the same steps 121, 122, 123, 124 with the exception of step 125 which generates the density map. Following the training of a first model at item 120, the model is stored and the method 200 progresses to item 210. At item 210, it is determined whether more than one trained model should be generated. For example, a second trained method may be based on a different type of kernel, and/or based on a different set of parameters. If it is determined that a further model should be trained, then the method 200 returns to item 120 where a further model is trained.

Conversely, if it is determined that no further models are required, then the method 200 progresses to item 220 where the models are combined. At item 210 the plurality of models with different parameters and/or kernel types are combined to produce a single ensemble/composite model a high level of accuracy and minimizes the error. This may be achieved by using a majority voting technique across each of the models, either on their own or in any number of combinations.

After the ensemble model has been generated by combining the models at item 220, the method 200 progresses to item 230 where a density map is generated from the ensemble model. This density map is then sent to a control system at item 130.

In yet a further example, a plurality of models may be trained as described above in relation to FIG. 2, and each model may be tested against test data or via another suitable method to determine a performance characteristic. The performance characteristic may be indicative of the accuracy and/or efficiency of each model. Based on the performance characteristic one of the trained models may be selected which has the highest performance characteristic. As such, the selected model will provide the strongest result representative of a forecast for future resource requirements which is highly accurate, without the need to combine multiple models, thereby minimising the processing required, and reducing the requirement to store multiple models.

Figure 3:
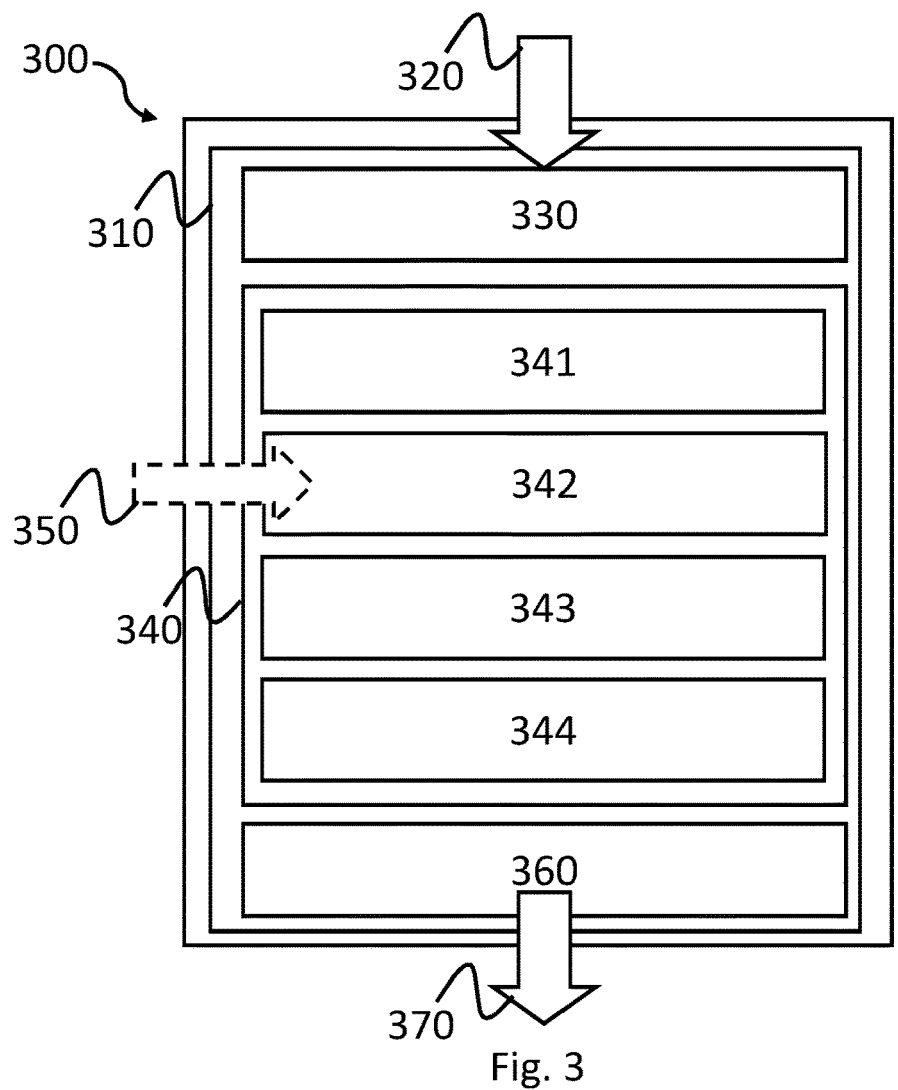
FIG. 3 shows schematically an apparatus according to a first example.

FIG. 3 shows schematically an apparatus 300 according to an example. The apparatus 300 is arranged to perform the methods 100, 200 described above in relation to FIGS. 1 and 2. The apparatus 300 comprises at least one processor 310 to perform said method, in some examples where the method 200 requires the training of multiple models, the apparatus may comprise a plurality of processors 310, as will be described below in relation to FIG. 4.

The processor 310 may be a central processing unit (CPU) a neural network accelerator, or neural processing unit (NPU), an image signal processor (ISP) or a graphics processing unit (GPU). It will be appreciated that the processor 310 may be any type of processor arranged to undertake the methods 100, 200 described above in relation to FIGS. 1 and 2.

The apparatus 300 is arranged to receive input data 320 in the form of transaction data. The transaction data is representative of past resource usage at a given location, and may, in some examples be obtained from memory, or in other examples may be input by a user of a system. The transaction data is representative of previous resource usage for a given location, such as data representing the locations of consignments sent and received in a particular period for a particular location. The particular location may be a given country, a given county/state, a city, a street, a postal or zip code area, or a particular building address. As such, for the particular location, the transaction data provides an overview of what the resource requirements of the particular location was in the time period. Data for a given consignment within the transaction data may comprise any of a shipment identifier, package dimensions, arrival and departure times, recipient address information, and sender address information. It will be appreciated that individual transactions within the transaction data may comprise other fields, and may only comprise some of the fields listed above.

The input data 320 is provided to an input module 330 of the processor 310 which may be arranged to buffer or otherwise temporarily store the input data in processor internal memory. The processor internal memory may be volatile or 'on-chip' memory, such as a synchronous dynamic random-access memory (SDRAM), or a double data rate synchronous dynamic random-access memory (DDR-SDRAM).

The processor 310 also comprises a training module 340 for training at least one model for generating a density map representative of the resource requirements for a given location. The training module 340 itself comprises a plurality of modules 341, 342, 343, 344. The input data 320 is first passed to a determination module 341 for determining a distribution associated with the input data 320. The determination module 341 may extract a pattern from the transaction data, for example, a pattern covering a particular time period. The extracted patterns may then be analysed to determine a distribution.

The training module 340 further comprises a kernel generation module 342 for generating a kernel for outputting an estimated distribution. The kernel is a machine learning kernel for use in a classifier, such as a support vector machine, and which is used to determine similarities between two sets of data, for example, the transaction data, or patterns within it and the density map to be generated representative of future resource requirements. The kernel is generated not only based on the distribution of the transaction data, but also on a set of one or more parameters 350, which in some examples may be obtained from external memory as will be described below with reference to FIG. 6.

The one or more parameters 350 represent information which may cause the distribution generated from the transaction data to be altered, for example, if the transaction data represents a particular period of time, such as over the Easter period in one year, then in another year the Easter period may not be in the same period, and as such resource requirements over that period may be lower than would be expected if the future resource requirements were based on data representative of the previous year's Easter period. Therefore, the set of parameters 350 may include date and time information, public holiday information, and even seasonal information such as the weather forecast on a particular day. In some examples, the set of parameters may comprise historical density maps for a given location representative of resource use over a different time period. It will be appreciated that a number of other parameters may be used to ensure the distribution more accurately reflects the period for which future resource requirements are to be determined. Furthermore, these parameters can vary based on the given location, for example, the set of public holidays in the United State differs from the set of public holidays in the United Kingdom, and where resources are being transported across borders, it will be necessary to consider, for example, the weather in both locations and the public holidays in both locations.

The training module 340 also comprises a refinement module 343 for refining the kernel generated by the kernel generation module 342. The refinement module 343 may be arranged to adjust the weighting factors associated with the kernel, such that the output of the kernel (the estimated distribution) more accurately represent the distribution determined by the determination module 341. This is achieved by comparing the estimated distribution and the distribution determined by the determination module 341. In some examples, refining the kernel may comprise selecting a different type of kernel, such as selecting any one of a gaussian, top hat or epanechnikov kernel, if they more accurately reflect the actual gradients of the distribution associated with the input data 320.

To determine the accuracy of any given kernel, the training module 340 further comprises a validation module 344. The validation module 344 may comprise generating an output from the kernel using test data, representative of the input data 320 (for example a similar period in a previous year) to determine whether the output of the kernel is substantially similar to the distribution determined by the distribution module 341. It will be appreciated that other methods of validating the output of the kernel may be used. If the output of the kernel is substantially similar, the distribution generated by the distribution module 341, the trained model is used by the processor 310 to generate a density map using the generation module 360. If the output of the kernel is not substantially similar, then the refinement module 343 may be used to further refine the kernel, which is then validated again using the validation module 34. This process may repeat until the kernel is validated and its output is substantially similar to the expected distribution.

The density map generated by the generation module 360 is representative of areas where resources will be required at a given future time. The density map also provides an indication of the number of resources required for example in the form of a heat map, where areas with larger resource requirements are shown with a higher density and areas with lower resource requirements are shown with lower density, as will be explained with reference to FIG. 5, below.

Following generation of the density map by the generation module 360, the density map is sent 370 to a control system (not shown). The control system may comprise a display or other resources for receiving the density map. For example, the display may be used to show the density map to a user of a system, so that they can arrange for resources to be allocated accordingly. Additionally and/or alternatively the density map may be sent to another resource of the control system, such as memory and/or a vehicle itself, such as a delivery vehicle or ride-sharing vehicle. In some examples where the vehicle is an autonomous vehicle, the density map may enable the vehicle to navigate to a required location at the future time, based on the resource requirements set out in the density map.

Figure 4:
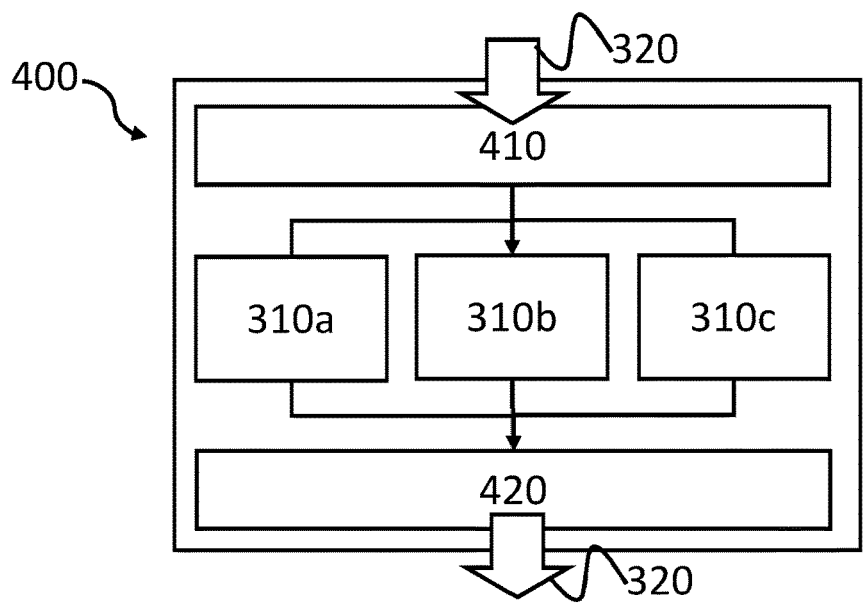
FIG. 4 shows schematically an apparatus according to a second example.

FIG. 4 shows schematically an apparatus 400 according to a second example. The apparatus 400 is arranged to receive input data 320 in the form of transaction data. The transaction data is representative of past resource usage at a given location, and may, in some examples be obtained from memory, or in other examples may be input by a user of a system. In this example, the input data 320 may be normalized by a normalization module 410. this ensures that differences between locations within the transaction data are adjusted relative to one another. For example, if location A has a high number of transactions, then data associated with location A may be normalized against a high transaction threshold, whereas if location B has a lower number of transactions, then data associated with location B may be normalized against a lower transaction threshold. This enables the data to be adjusted, and kernels generated which take into account particularly busy locations. In the example of the delivery of consignments, where a particular delivery company has a hub, a large number of transactions will be contained within the data which list the location of the hub, this could adversely affect the kernel generation process, and as such, normalizing the distribution generated from the transaction data can account for this anomalous location.

The apparatus 400 may also comprise a plurality of processors 310*a*, 310*b*, 310*c*, such as the processor 310 described above in relation to FIG. 4. Each of the plurality of processors 310*a*, 310*b*, 310*c* may be arranged to train different models, for example, models based on different kernels, or alternatively they may be arranged to train models using different sets of parameters. Each of the processors 310*a*, 310*b*, 310*c* outputs the different trained models which are then combined by an optimisation module 420 which is arranged to generate a density map based on the plurality of trained models output by the processors 310*a*, 310*b*, 310*c*.

The optimisation module 420 may be arranged to generate a performance characteristic indicative of the accuracy and/or efficiency of each model. Based on the performance characteristic the trained models with the highest performance characteristic may be selected. As such, the selected model will provide the strongest result outputting a forecast for future resource requirements which is highly accurate, without the need to combine multiple models, thereby minimising the processing required. The selected model may then be used to generate a density map which is output 320 to a control system (not shown).

Alternatively, the optimisation module 420 may be used to combine the plurality of trained models to produce a single ensemble/composite model a high level of accuracy and minimizes the error. This may be achieved by using a majority voting technique across each of the models, either on their own or in any number of combinations. The ensemble model may then be used to generate a density map which is output 320 to a control system (not shown).

Figure 5:
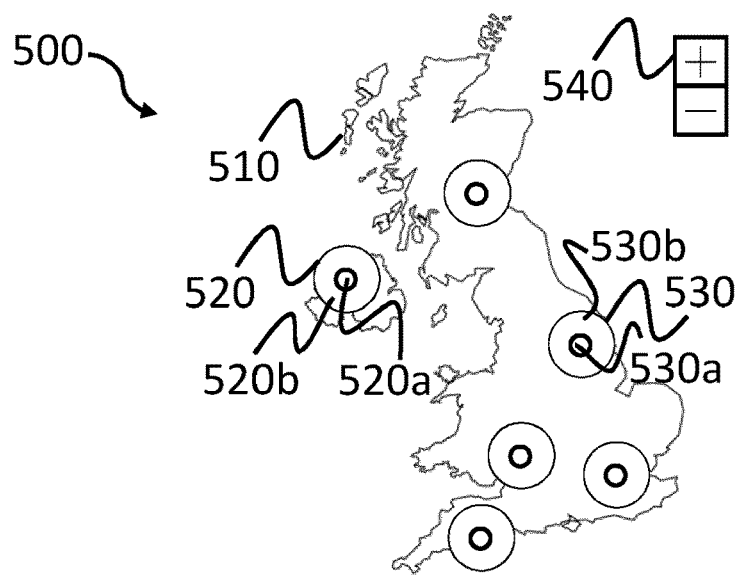
FIG. 5 shows schematically a density map generated by the method of FIG. 1 or 2.

FIG. 5 shows schematically a density map 500 generated by the method 100, 200 described above in relation to FIG. 1 or 2. The density map 500 represents an area 510, and the resource requirements 520, 530 for locations within that area 510, in the form of a heat map. It will be appreciated that the density map 500 may represent the resource requirements for a given area 510 in other ways suitable for indicating the relative resource requirements.

In FIG. 5, the density map 500 shows the United Kingdom 510, and areas where the trained model or models have indicated that particular resources are required. In some examples, each of the locations may be based on different transaction data and/or trained models, such that a plurality of individual density maps for each location are generated using the methods 100, 200 described above in FIGS. 1 and 2. These individual density maps may be combined to produce a composite density map 500 covering a plurality of locations.

Each location 520, 530 is shown on the density map 500 based on the density of the resources required. The density of the resources is determined by the model trained in methods 100, 200, and provides an indication of areas where there are a large demand for resources, and areas where there is a lesser demand for resources. This may be shown by areas being delineated on the density map as shown in FIG. 5, or alternatively may be shown using different colours, where the colours blend from one to another to indicate a change in the resource requirements.

For example, an area with large resource requirements 520*a*. 530*a* may be outlined on a map in a bold line as shown in the density map 500 of FIG. 5, or in a line of a particular colour. Alternatively, the area may be overlaid with a colour indicating high resource requirements. It will be appreciated that a combination of these different ways of indicating the density may be used, as may other ways of indicating resource requirements. Similarly, an area where there are lesser resource requirements 520*b*, 530*b* may be indicated by a thinner line, a line of a different colour, or by being overlaid with a colour indicating lower resource requirements. The different indications used may be detailed in a legend or key for understanding by a user.

In some examples, it may be desirable for the density map 500 to be manipulated, or altered by a user to obtain a more detailed view for a particular location. In such an example, the density map 500 may be provided as part of a user interface to a computer program which comprises a zoom feature 540. The user interface may provide other controls, such as panning controls, which enable the user to navigate around the density map, to view an area of particular interest.

When the user zooms in and out of the density map 500, the density map 500 may be updated to provide a more detailed view of the area of interest, such as at a county/state, city or even street level. In some examples, where the density map 500 comprises such information it may be provided directly to the user, in other examples, it will be appreciated that further density maps may need to be generated based on transaction data for the new location, new sets of parameters, and/or different models or kernels.

Figure 6:
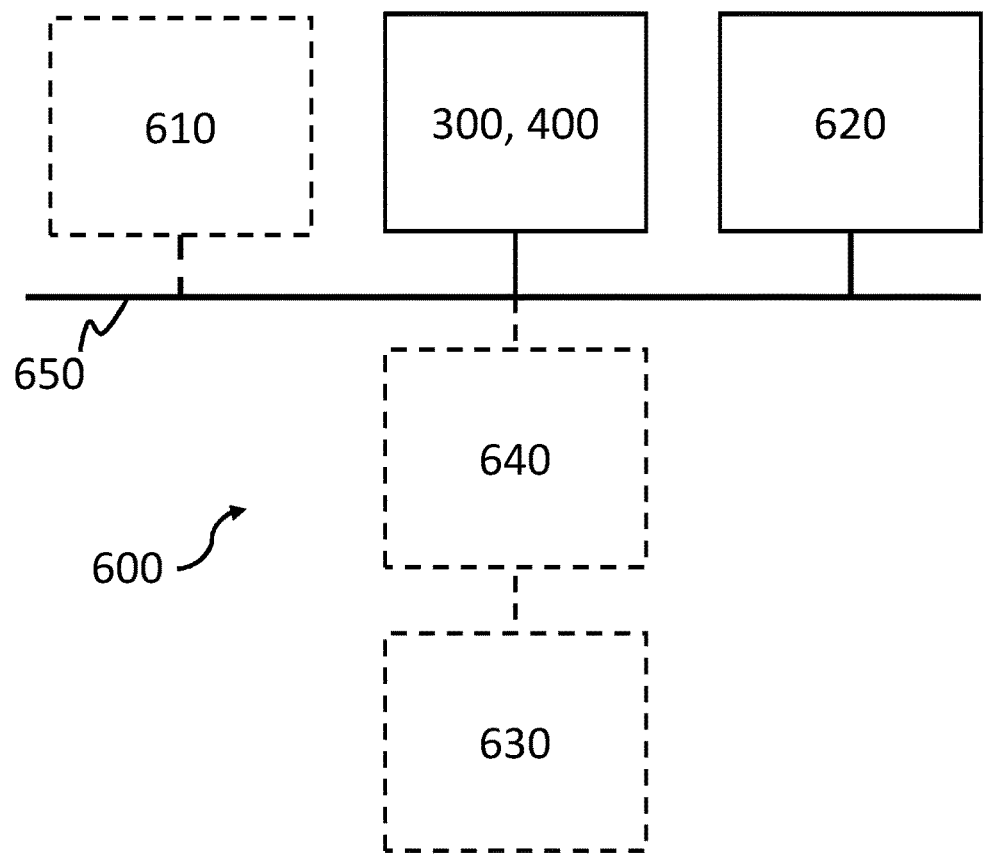
FIG. 6 shows schematically a system according to an example.

FIG. 6 shows schematically a system 600 according to an example. The system may form part of a computer terminal used to allocate resources to given locations, and in some examples may form part of a vehicle which is capable of reviewing the information within the density map and navigating to required locations. The system 600 comprises an input device 610, an apparatus 300, 400 such as the apparatus described above in relation to FIGS. 3 and 4, and an output device 620. The output device may be a display for presenting the density map to a user, or as mentioned above may be a vehicle navigation system which analyses the density map and determines a location for the vehicle to navigate to, either autonomously or with the help of driver input.

The input device 610 may be a user interaction device, such as a mouse, keyboard or touch screen element associated with a display or other output device, which may be used by the user to input transaction data, the set of parameters, or even adjust a density map generated by the apparatus 300, 400.

In some examples, the system 600 may comprise external storage 630 for storing the density maps, previous density maps for given locations and time periods, and sets of parameters, such as information relating to public holidays. The storage 630 is accessed via a memory controller 640. The storage 630 may also be arranged to store other information for use by the system 600, such as a computer programme for determining the density maps, and/or providing a user interface to the user for viewing or editing the density maps.

The memory controller 640 may comprise a dynamic memory controller (DMC). The memory controller 640 is coupled to the storage 630. The memory controller 640 is configured to manage the flow of data going to and from the storage 630. The storage 630 may comprise a main memory, otherwise referred to as a 'primary memory'. The storage 630 may be external storage, in that the storage 630 is external to the system 600. For example, the storage 630 may comprise 'off-chip' memory. The storage 630 may have a greater storage capacity than memory cache(s) of the apparatus 300, 400. In some examples, the storage 630 is comprised in the system 600. For example, the storage 630 may comprise 'on-chip' memory. The storage 630 may, for example, comprise a magnetic or optical disk and disk drive or a solid-state drive (SSD). In some examples, the storage 630 comprises a synchronous dynamic random-access memory (SDRAM). For example, the storage 630 may comprise a double data rate synchronous dynamic random-access memory (DDR-SDRAM).

One or more of the input device 610, the apparatus 300, 400, the output device 620 and the memory controller 640 may be interconnected, for example, using system bus 650. This allows data to be transferred between the various components. The system bus 650 may be or include any suitable interface or bus The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method for determining future resource requirements in a given location, the method comprising the steps of:
   obtaining transaction data, the transaction data indicative of past resource use at a plurality of locations, which includes the give location;
   training at least one machine learning model based on a set of parameters by:
      determining a distribution of resources associated with the transaction data;
      generating a machine learning kernel based on the set of parameters, the machine learning kernel being arranged to output an estimated distribution of resources over the plurality of locations; and
      refining and validating the machine learning kernel based on a comparison between the distribution and the estimated distribution of the resources;
   generating a density map of the resources for the plurality of locations based on the at least one trained machine learning model; and
   sending the density map to a control system for determining future resource requirements in the given location.

2. The method of claim 1, wherein the step of determining the distribution of resources comprises the step of:
   extracting a pattern from the transaction data; and
   analysing the pattern from the transaction data to determine the distribution of resources.

3. The method of claim 1, further comprising
   the step of normalizing the transaction data, wherein the step of determining a distribution of resources is associated with the normalized transaction data.

4. The method of claim 1, wherein the step of generating the density map of the resources comprises:
   determining a performance characteristic for each of a plurality of trained machine learning models; and
   selecting at least one of the trained machine learning models based on the performance characteristic.

5. The method of claim 1, wherein the step of generating the density map of the resources based on the at least one trained machine learning model comprises:
   combining a plurality of trained machine learning models to generate a composite machine learning model; and
   generating the density map of the resources based on the composite machine learning model.

6. The method of claim 1, wherein the set of parameters comprises at least one of:
   date;
   time;
   public holidays; and
   weather conditions associated with the plurality of locations.

7. The method of claim 1, further comprising the step of outputting the density map of the resources to at least one of:
   a display of the control system; and
   a resource of the control system.

8. An apparatus for determining future resource requirements in a given location, the apparatus comprising at least one processor, wherein the apparatus is configured to:
   obtain transaction data, the transaction data indicative of past resource use at a plurality of locations, which includes the given location:
   train at least one machine learning model based on a set of parameters by:
      determining a distribution of resources associated with the transaction data;
      generating a machine learning kernel based on the of set parameters, the machine learning kernel being arranged to output an estimated distribution of resources over the plurality of locations; and
      refining and validating the machine learning kernel based on a comparison between the distribution and the estimated distribution of the resources;
   generate a density map of the resources for the plurality of locations based on the at least one trained machine learning model; and
   send the density map to a control system to determine future resource requirements in the given location.

9. A computer-readable non-transitory storage medium, storing instructions
   that, when executed by a processor, cause the processor to:
      obtain transaction data, the transaction data indicative of past resource use at a a plurality of locations, which includes a given location;
      train at least one machine learning model based on a set of parameters by:
         determining a distribution of resources associated with the transaction data;
         generating a machine learning kernel based on the of set parameters, the machine learning kernel being arranged to output an estimated distribution of resources over the plurality of locations; and
         refining and validating the machine learning kernel based on a comparison between the distribution and the estimated distribution of the resources;
      generate a density map of the resources for the plurality of locations based on the at least one trained machine learning model; and
      send the density map to a control system to determine future resource requirements at a given location.

10. The apparatus of claim 8, wherein the step of determining the distribution of resources comprises the step of:
    extracting a pattern from the transaction data; and
    analysing the pattern from the transaction data to determine the distribution of resources.

11. The apparatus of claim 8, wherein the apparatus is configured to normalize the transaction data, wherein the step of determining a distribution of resources is associated with the normalized transaction data.

12. The apparatus of claim 8, wherein to generate the density map of the resources comprises:
   to determine a performance characteristic for each of a plurality of trained machine learning models; and
   to select at least one of the trained machine learning models based on the performance characteristic.

13. The apparatus of claim 8, wherein to generate the density map of the resources based on the at least one trained machine learning model comprises:
   to combine a plurality of trained machine learning models to generate a composite machine learning model; and
   to generate the density map of the resources based on the composite machine learning model.

14. The apparatus of claim 8, wherein the set of parameters comprises at least one of:
   date;
   time;
   public holidays; and
   weather conditions associated with the plurality of locations.

15. The apparatus of claim 8, wherein the apparatus is configured to output the density map of the resources to at least one of:
   a display of the control system; and
   a resource of the control system.

* * * * *